United States Patent
Ikuta

(10) Patent No.: US 6,805,597 B2
(45) Date of Patent: Oct. 19, 2004

(54) SHARED ELECTRICAL AND OPTICAL TRANSMISSION EQUIPMENT OF PLUG-AND-JACK TYPE, AND ELECTRONIC DEVICE EQUIPPED THEREWITH

(75) Inventor: Mitsuhisa Ikuta, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/649,822

(22) Filed: Aug. 28, 2003

(65) Prior Publication Data

US 2004/0043668 A1 Mar. 4, 2004

(30) Foreign Application Priority Data

Aug. 28, 2002 (JP) ........................................ 2002-248983

(51) Int. Cl.⁷ ............................................ H01R 13/02
(52) U.S. Cl. ...................................................... 439/886
(58) Field of Search ................................ 439/886, 885, 439/83, 876, 668

(56) References Cited

U.S. PATENT DOCUMENTS 6,379,161 B1 * 4/2002 Ma .............................. 439/83
6,438,832 B1 * 8/2002 Costa ........................... 29/885
6,439,900 B1 * 8/2002 Sward ......................... 439/131

FOREIGN PATENT DOCUMENTS

| JP | 6-140106 A | 5/1994 |
| JP | 6-200395 A | 7/1994 |
| JP | 8-273798 A | 10/1996 |

* cited by examiner

*Primary Examiner*—Gary Paumen
(74) *Attorney, Agent, or Firm*—Birch, Stewart, Kolasch & Birch, LLP

(57) ABSTRACT

The identification terminals 16, 17 are entirely plated with solder, and additionally plated with gold near their extreme ends. This arrangement avoids increase of the contact resistance between the extreme end of the identification terminal 16 and the bulge of the identification terminal 17, keeping the contact resistance at 30 mΩ or below. The legs of the identification terminals 16, 17 are only plated with solder and not plated with gold. Hence, even if this shared electrical/optical transmission equipment 11 is left in the atmosphere, the solder-plated legs of the identification terminals 16, 17 do not deteriorate in solderability. Consequently, when the shared electrical/optical transmission equipment 11 is mounted on a substrate, the legs of the identification terminals 16, 17 can be soldered easily.

4 Claims, 3 Drawing Sheets

SHARED ELECTRICAL AND OPTICAL TRANSMISSION EQUIPMENT OF PLUG-AND-JACK TYPE, AND ELECTRONIC DEVICE EQUIPPED THEREWITH

This Nonprovisional application claims priority under 35 U.S.C. §119(a) on Patent Application No(s). 2002-248983 filed in JAPAN on Aug. 28, 2002, the entire contents of which are hereby incorporated by reference.

BACKGROUND OF THE INVENTION

The present invention relates to a shared electrical/optical transmission equipment of a plug-and-jack type which is used for input and output in an audio device, an information terminal and the like. The invention also relates to an electronic device equipped with this transmission equipment.

Such a shared electrical/optical transmission equipment of a plug-and-jack type is provided in an electronic device such as an audio device or an information terminal, and is capable of receiving a round optical plug and a single-prong electrical plug. The shared electrical/optical transmission equipment has an insertion port which selectively receives either of a round optical plug or a single-prong electrical plug. With a round optical plug inserted, the transmission equipment exchanges an optical signal with an external device of the electronic device. With a single-prong electrical plug inserted, the transmission equipment establishes input/output paths for an electrical signal between an internal part of the electronic device and an external device.

For example, suppose that a shared electrical/optical transmission equipment of a plug-and-jack type is applied to an audio device. In this case, when a round optical plug or a single-prong electrical plug is selectively inserted in the insertion port of the shared electrical/optical transmission equipment, the transmission equipment can exchange an optical signal or can establish input/output paths for a digital or analog electrical signal.

In order to identify the type of plug inserted in the insertion hole, i.e. a round optical plug or a single-prong electrical plug, the shared electrical/optical transmission equipment of a plug-and-jack type contains a pair of identification terminals at the insertion port. If a single-prong electrical plug is inserted in the insertion port, the plug pushes the identification terminals and establishes mutual contact between them. On the other hand, a round optical plug inserted in the insertion port does not cause such mutual contact. Thus, the plug type can be identified, depending on whether the identification terminals are in mutual contact or not. For reliable plug identification, the contact resistance between the identification terminals should be kept at 30 mΩ or below when they are in contact with each other. This is done by plating the identification terminals with silver.

Nevertheless, while a silver plate is left in the atmosphere, sulfuration proceeds at its surface. Hence, if a shared electrical/optical transmission equipment is left without being mounted on the substrate of an electronic device, the surfaces of the silver-plated identification terminals undergo sulfuration. On the one hand, sulfuration deteriorates solderability at the surfaces of the silver-plated identification terminals, making it impossible to mount the transmission equipment on the substrate of an electronic device. On the other hand, sulfuration results in increase of the contact resistance between the identification terminals, in which case reliable plug identification cannot be expected.

The present invention is made in light of these conventional problems, and intends to provide a shared electrical/optical transmission equipment of a plug-and-jack type which prevents deterioration in solderability of the identification terminals and which avoids increase of the contact resistance between the identification terminals, even if the transmission equipment is left in the atmosphere. In addition, the present invention intends to provide an electronic device equipped with this transmission equipment.

SUMMARY OF THE INVENTION

To solve the above problems, the present invention is concerned with a shared electrical and optical transmission equipment of a plug-and-jack type at least comprising a main body which contains an insertion port for selectively receiving either of a round optical plug or a single-prong electrical plug, an optical semiconductor chip which exchanges an optical signal with a round optical plug inserted in the insertion port of the main body, at least one terminal which makes electrical contact with a single-prong electrical plug inserted in the insertion port of the main body, a pair of identification terminals which make mutual contact when pushed by either of the round optical plug or the single-prong electrical plug inserted in the insertion port of the main body. In this transmission equipment, each of the pair of identification terminals has a connection portion to connect to an external device as well as a contact portion to make contact with the other identification terminal. The connection portion is plated at least with solder, and the contact portion is plated with gold.

According to the present invention of this arrangement, each of the identification terminals has a connection portion to connect to an external device as well as a contact portion to make contact with the other identification terminal. The connection portion is plated at least with solder, whereas the contact portion is plated with gold in addition to solder. As a result, even if the shared electrical/optical transmission equipment is left in the atmosphere, the solder-plated connection portions of the identification terminals do not deteriorate in solderability. Besides, since the gold plates undergo neither sulfuration nor oxidation while left in the atmosphere, it is possible to avoid increase of the contact resistance between the gold-plated contact portions of the identification terminals.

In the present invention, each of the pair of identification terminals may be entirely plated with solder, and additionally plated with gold exclusively at the contact portion. The gold plate may be a flash plate. Since gold plating is applied to the surface of the solder plate, it is possible to decrease the thickness of a gold-plated layer and thereby to reduce the amount of gold required.

Further in the present invention, a value of resistance between the identification terminals may be 30 mΩ or below when they are in contact with each other.

With the value of resistance between the identification terminals being set in this range, the transmission equipment can reliably identify which of a round optical plug or a single-prong electrical plug is inserted in the insertion port.

In addition, an electronic device of the present invention is equipped with a shared electrical/optical transmission equipment of a plug-and-jack type according to the present invention.

In other words, the present invention is not limited to a shared electrical/optical transmission equipment of a plug-and-jack type, but further encompasses an electronic device which adopts this plug-and-jack type shared electrical/optical transmission equipment. The electronic device may be of any kind as far as being adapted for input and output of an optical signal and an electrical signal. As such, there may be mentioned reproducing apparatus, image receiver and the like, including audio devices, DVD players, VTRs and CD players.

DESCRIPTION OF THE PREFERRED EMBODIMENTS

Referring to the attached drawings, an embodiment of the present invention is hereinafter described in detail.

Figure 1:
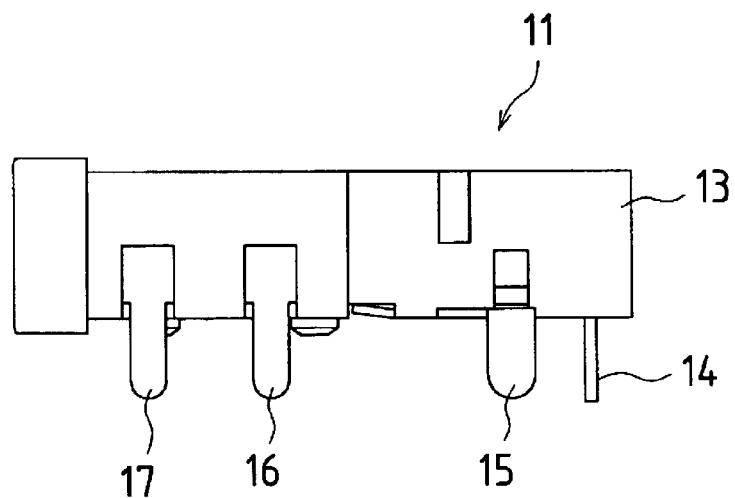
FIG. 1 is a side view showing an embodiment of a shared electrical/optical transmission equipment of a plug-and-jack type according to the present invention.

FIG. 1 to FIG. 4 illustrate an embodiment of a shared electrical/optical transmission equipment of a plug-and-jack type according to the present invention. FIG. 1 is a side view of a shared electrical/optical transmission equipment 11 concerning this embodiment.

Figure 2:
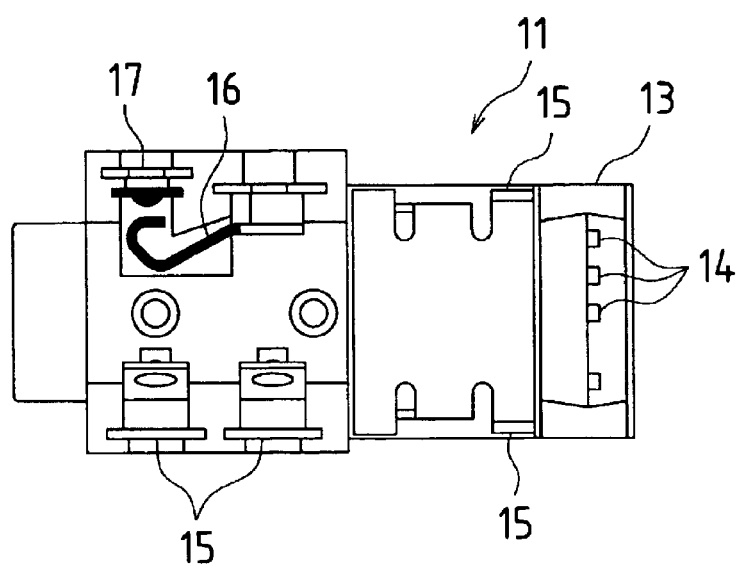
FIG. 2 is a bottom view showing the shared electrical/optical transmission equipment of a plug-and-jack type concerning this embodiment.
Figure 3:
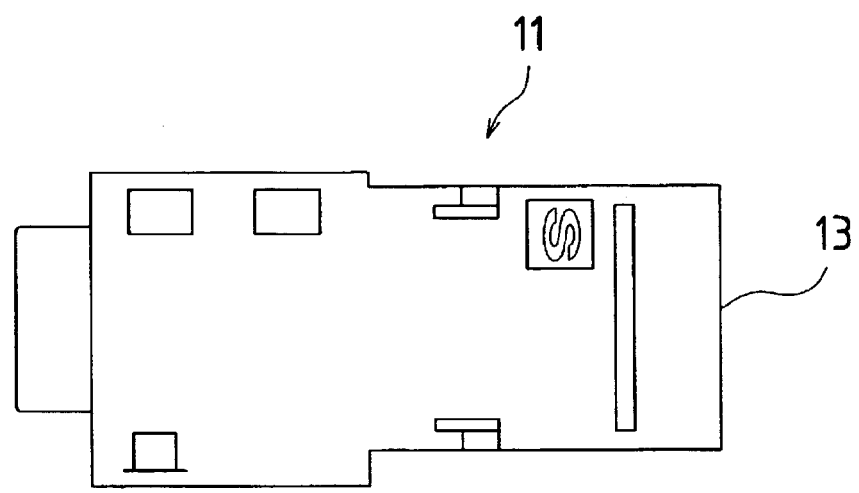
FIG. 3 is a plan view showing the shared electrical/optical transmission equipment of a plug-and-jack type concerning this embodiment.
Figure 4:
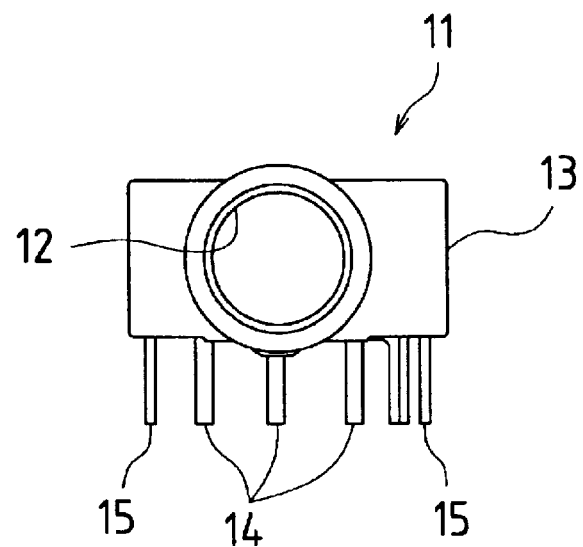
FIG. 4 is a front view showing the shared electrical/optical transmission equipment of a plug-and-jack type concerning this embodiment.

FIG. 2 is a bottom view of the shared electrical/optical transmission equipment 11, FIG. 3 is a plan view thereof, and FIG. 4 is a front view thereof.

Regarding the shared electrical/optical transmission equipment 11 shown in FIG. 1 to FIG. 4, its main body 13 has an insertion port 12 which selectively receives either of a round optical plug or a single-prong electrical plug. An optical semiconductor chip (not shown) locates at the end of the insertion port 12. The main body 13 is also equipped with terminals 14, terminals 15, and a pair of identification terminals 16, 17. When a round optical plug is inserted in the insertion port 12, an optical signal is exchanged between the round optical plug and the optical semiconductor chip at the end of the insertion port 12, whereby an electrical signal which corresponds to the optical signal is input and output through the terminals 14. When a single-prong electrical plug is inserted in the insertion port 12, the plug makes contact with the terminals 15, whereby electrical signals are input and output through the single-prong electrical plug and the terminals 15.

By way of example, suppose that an audio device is equipped with this shared electrical/optical transmission equipment 11. If a round optical plug is inserted in the insertion port 12, the shared electrical/optical transmission equipment 11 exchanges an optical signal between the audio device and an external device. If a single-prong electrical plug is inserted in the insertion port 12, the shared electrical/optical transmission equipment 11 establishes input/output paths for a digital or analog electrical signal.

Figure 5:
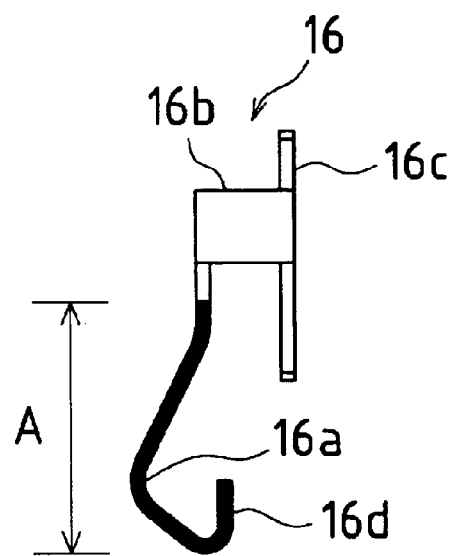
FIG. 5 is a side view showing the first identification terminal in the shared electrical/optical transmission equipment of a plug-and-jack type concerning this embodiment.

As for the identification terminals, a first identification terminal 16 is bent in the fashion illustrated in FIG. 5. The terminal 16 is secured to the main body 13 at a support 16b, with a curved portion 16a locating slightly inside the insertion port 12 and a leg 16c projecting from the main body 13. A second identification terminal 17 is bent in the fashion illustrated in FIG. 6. The terminal 17 is secured to the main body 13 at a support 17b, with a bulge 17a at the extreme end being opposed to an extreme end 16d of the identification terminal 16, and a leg 17c projecting from the main body 13.

With this structure, if a single-prong electrical plug is inserted in the insertion port 12, the plug touches and pushes the curved portion 16a of the identification terminal 16, displacing the curved portion 16a toward the identification terminal 17 until the extreme end 16d of the identification terminal 16 comes into contact with the bulge 17a at the extreme end of the identification terminal 17. On the other hand, if a round optical plug is inserted in the insertion port 12, the plug does not touch the curved portion 16a of the identification terminal 16, leaving the identification terminal 16 out of contact with the identification terminal 17. Thus, the shared electrical/optical transmission equipment 11 can identify which of a single-prong electrical plug or a round optical plug is inserted in the insertion port 12, depending on whether the identification terminals 16, 17 are in mutual contact or not. For reliable plug identification, the contact resistance between the identification terminals 16, 17 should be kept at 30 mΩ or below when they are in contact with each other.

Figure 6:
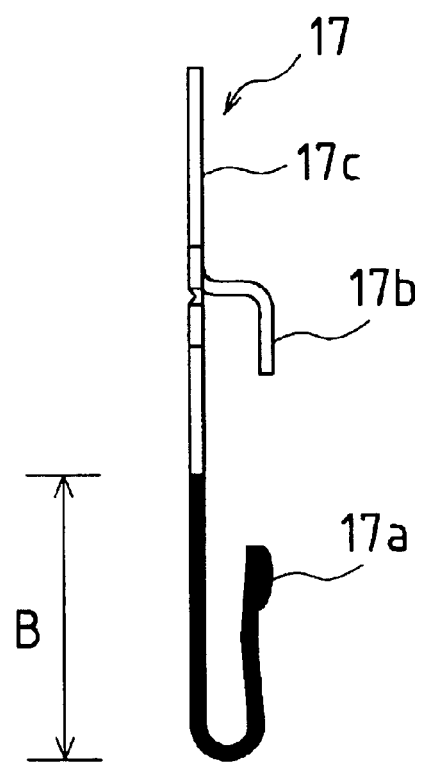
FIG. 6 is a side view showing the second identification terminal in the shared electrical/optical transmission equipment of a plug-and-jack type concerning this embodiment.

In this regard, both of the identification terminals 16, 17 are entirely plated with solder. Then, the first identification terminal 16 is additionally plated with gold, at the region A which includes the extreme end 16d as indicated in FIG. 5. Likewise, the second identification terminal 17 is additionally plated with gold, at the region B which includes the bulge 17a as indicated in FIG. 6. Since these gold plates undergo neither sulfuration nor oxidation while left in the atmosphere, the contact resistance between the extreme end 16d of the identification terminal 16 and the bulge 17a of the identification terminal 17 does not increase but remains at 30 mΩ or below. As the gold plate, a flash plate can give a thinner gold-plated layer and thus requires a less amount of gold.

In contrast, the legs 16c, 17c of the identification terminals 16, 17 are only plated with solder, and not plated with gold. Owing to this arrangement, even if this shared electrical/optical transmission equipment 11 is left in the atmosphere, the solder-plated legs 16c, 17c of the identification terminals 16, 17 do not deteriorate in solderability. Consequently, when the shared electrical/optical transmission equipment 11 is mounted on a substrate, the legs 16c, 17c of the identification terminals 16, 17 can be soldered easily.

It should be understood that the present invention is not limited to the above embodiment, but may be modified in various manners. By way of example, the identification terminals may be changed in shape. Besides, a pair of identification terminals may be arranged to make mutual contact in response to insertion of a round optical plug, but not to make contact in response to insertion of a single-prong electrical plug.

Moreover, the present invention is not limited to a shared electrical/optical transmission equipment of a plug-and-jack type, but further encompasses an electronic device which adopts this plug-and-jack type shared electrical/optical transmission equipment. The electronic device may be of any kind as far as being adapted for input and output of an optical signal and an electrical signal. As such, there may be mentioned reproducing apparatus, image receiver and the like, including audio devices, DVD players, VTRs and CD players.

According to the present invention described above, each of the identification terminals has a connection portion to connect to an external device as well as a contact portion to make contact with the other identification terminal. The connection portion is plated at least with solder, whereas the contact portion is plated with gold in addition to solder. As a result, even if the shared electrical/optical transmission equipment is left in the atmosphere, the solder-plated connection portions of the identification terminals do not deteriorate in solderability. Besides, since the gold plates undergo neither sulfuration nor oxidation while left in the atmosphere, it is possible to avoid increase of the contact resistance between the gold-plated contact portions of the identification terminals.

Furthermore, since gold plating or flash plating is applied to the surface of the solder plate, it is possible to decrease the thickness of gold plates and thereby to reduce the amount of gold required.

This application is based on Patent Application No. 2002-248983 filed in Japan, the contents of which are incorporated hereto by reference.

What is claimed is:

1. A shared electrical and optical transmission equipment of a plug-and-jack type, at least comprising a main body which contains an insertion port for selectively receiving either of a round optical plug or a single-prong electrical plug, an optical semiconductor chip which exchanges an optical signal with a round optical plug inserted in the insertion port of the main body, at least one terminal which makes electrical contact with a single-prong electrical plug inserted in the insertion port of the main body, a pair of identification terminals which make mutual contact when pushed by either of the round optical plug or the single-prong electrical plug inserted in the insertion port of the main body, each of the pair of identification terminals having a connection portion to connect to an external device as well as a contact portion to make contact with the other identification terminal, the connection portion being plated at least with solder and the contact portion being plated with gold, wherein each of the pair of identification terminals is entirely plated with solder, and additionally plated with gold exclusively at the contact portion.

2. A shared electrical and optical transmission equipment of a plug-and-jack type according to claim 1, wherein the gold plate is a flash plate.

3. A shared electrical and optical transmission equipment of a plug-and-jack type according to claim 1, wherein a value of resistance between the identification terminals is 30 mΩ or below when they are in contact with each other.

4. An electronic device which is equipped with a shared electrical and optical transmission equipment of a plug-and-jack type according to claim 1.

* * * * *